UNITED STATES PATENT OFFICE.

WALTER S. LANDIS, OF NIAGARA FALLS, NEW YORK, ASSIGNOR TO AMERICAN CYANAMID COMPANY, OF NASHVILLE, TENNESSEE, A CORPORATION OF MAINE.

PROCESS OF MAKING AMMONIA FROM CALCIUM CYANAMID.

1,149,653.  Specification of Letters Patent.  Patented Aug. 10, 1915.

No Drawing.  Application filed June 18, 1914.  Serial No. 845,970.

*To all whom it may concern:*

Be it known that I, WALTER S. LANDIS, a citizen of the United States, residing at Niagara Falls, in the county of Niagara and State of New York, have invented certain new and useful Improvements in Processes of Making Ammonia from Calcium Cyanamid; and I do hereby declare the following to be a full, clear, and exact description of the invention, such as will enable others skilled in the art to which it appertains to make and use the same.

This invention relates to a process of making ammonia from calcium cyanamid and has for its object to provide a procedure which will be more efficient and less costly than those heretofore proposed.

With these and other objects in view the invention consists in the novel steps and combinations of steps constituting my process, all as will be more fully hereinafter disclosed and particularly pointed out in the claims.

As is well known calcium cyanamid in its crude state consists of, approximately 60% calcium cyanamid, $CaCN_2$, 25% lime, CaO, 12% carbon in the form of graphite, and the remainder of various impurities picked up in the process from the raw materials entering into its manufacture; these latter impurities being of no importance to this process. On treating calcium cyanamid with water a portion of the $CaCN_2$ passes over into ammonia, according to the following equation:

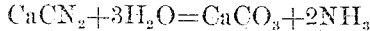

$$CaCN_2 + 3H_2O = CaCO_3 + 2NH_3$$

If this reaction is carried out at ordinary temperatures the amount of transformation is very small, usually amounting to less than 10% of the whole cyanamid, and the remainder of the calcium cyanamid is transferred into dicyandiamid, urea and various complex organic compounds. But if this reaction is made to take place at a high temperature of say 150° C. and above, or, in other words, in an autoclave under steam pressure of 3½ or 4 atmospheres and upward, the reaction takes place very rapidly and cyanamid has been thus used for a long time as a commercial source of ammonia. However, this high temperature does not prevent a portion of the cyanamid decomposing into dicyandiamid and various other organic compounds, and there is always a considerable loss of nitrogen, even under the best conditions of carrying out the reaction, in the manner described. This loss is largely due to the formation of dicyandiamid, which compound does not seem to be broken up into ammonia in a strongly alkaline solution in the autoclave, probably because the alkali present, calcium hydrate, $Ca(OH)_2$, is not sufficiently strong to cause a decomposition of the dicyandiamid. At best, working on a large scale in the autoclave holding 2 to 6 tons of cyanamid at an operation, it has been found that only from 85 to 90% of the calcium cyanamid is decomposed into ammonia under the most skilful production and operation.

I have discovered however, that if a small quantity of alkali, such as sodium hydroxid, or potassium hydroxid, is introduced with the calcium cyanamid into the autoclave, a much more efficient transformation into ammonia is obtained, and yields as high as 98% of the nitrogen present in the form of ammonia, may be obtained if sufficient alkali has been added. As far as I can determine the action of this alkali is to decompose dicyandiamid into ammonia, although a portion of said alkali seems to act in a restraining manner on the formation of the dicyandiamid itself. I have made repeated tests on pure dicyandiamid and find that it can be almost completely decomposed under high pressure by the use of sodium hydroxid, potassium hydroxid or similar strong alkalis of this kind.

The most economical amount of sodium hydroxid to be added is somewhat indeterminate inasmuch as the more that is added up to a certain proportion, the better will be the yield of ammonia, but for commercial reasons, as well as for theoretical reasons, it is found best to restrict the addition of alkali in all cases to less than 10% of the weight of the crude calcium cyanamid charged into the autoclave. But again, smaller quantities as for instance 2 to 4%, give very good results in increasing the yield of ammonia from the cyanamid.

Inasmuch as there is a large amount of free lime present in the crude cyanamid charged into the autoclave it is not necessary that such alkali addition be made in the form of hydroxid, but I can use cheaper salts like potash, soda ash, or sulfates of these elements, and have even obtained some fairly promising results from the addition of chlorids. It is, of course possible also where commercial conditions permit, to use mixtures of these compounds, though I have found that in all the large number of possible mixtures there should always be present either some hydrate, carbonate or sulfate of sodium, potassium or similar element, as these seem to be the most effective agents both in decomposing the dicyandiamid and in preventing its formation, because of their ease of transformation to the hydrate form. It is a simple matter for one skilled in the art of manufacturing ammonia from cyanamid to make these additions inasmuch as the salts can be mixed in the grinding mill with the calcium cyanamid, or can be added in the form of solution to the charge entering into the autoclave, since all of them are soluble in water.

I am aware that the British Patent #18207 of 1911 has been granted to Lydholm, wherein he uses one part by weight of lime nitrogen to two parts by weight of an alkali salt, and wherein the patentee states that 99 per cent. of the total nitrogen contained in the nitro-lime were set free in 15 minutes. I have, however, carried out the process of Lydholm, following his specification, and have been unable to attain the results he states. Large scale tests have shown that it is an error to suppose that the alkali salts are causticized by the free lime present, except to a small extent, and therefore it has even been found necessary in many cases to add free lime, usually about 50 per cent. of the amount of said salts employed to assist in this causticizing action.

In other words, I have found it an unnecessary waste of material to employ more of such salts than the free lime in the mixture will causticize, and therefore, any such proportions as those given by Lydholm involve many times the amount of said salts that is necessary for the success of the process. Owing to this state of facts, I have discovered, that in the majority of cases, a quantity of such salts not exceeding 3 per cent. or 4 per cent. or 5 per cent. of the weight of the lime nitrogen is all that is needed, and that when such quantities are used, in my process efficiencies are readily attained that are much greater than any I have been able to attain when following Lydholm's disclosure.

It is obvious that those skilled in the art may vary the details of my process as well as the additions to the calcium cyanamid without departing from the spirit of my invention. For example, the quantity of the reagent in any case will be largely governed by commercial considerations; a large number of other salts than those mentioned, as well as combinations of such salts may be employed, and others might be formed in the autoclave, and therefore I do not wish to be limited to the above disclosure except as may be required by the claims.

What I claim is:

1. The process of producing ammonia from commercial calcium cyanamid which consists in treating said cyanamid with steam and adding less than 10% of the weight of said cyanamid of a salt having an alkaline reaction that will reduce the amount of dicyandiamid which would be otherwise produced if said salt be not added, substantially as described.

2. The process of producing ammonia from commercial calcium cyanamid which consists in treating said cyanamid with steam above 120° C. in the presence of less than 10% of the weight of said cyanamid of salt having a restraining action on the simultaneous production of dicyandiamid, substantially as described.

3. The process of producing ammonia from commercial cyanamid which consists in treating said cyanamid with steam above 130° C. and adding less than 10% by weight of a salt having an alkaline reaction to the mass to reduce the formation of dicyandiamid, substantially as described.

4. The process of producing ammonia from commercial calcium cyanamid which consists in adding less than 10% by weight of a salt of an alkali to said cyanamid and treating the same with steam, substantially as described.

5. The process of increasing the yield of ammonia from commercial calcium cyanamid when treated with steam, which consists in treating said cyanamid with steam in the presence of less than 6% by weight of a salt of an alkali, substantially as described.

In testimony whereof I affix my signature, in presence of two witnesses.

WALTER S. LANDIS.

Witnesses:
S. HANNA,
J. L. DOLAN.